United States Patent [19]

Karlin et al.

[11] Patent Number: 5,306,082
[45] Date of Patent: Apr. 26, 1994

[54] APPLIANCE DOORS AND PANELS

[76] Inventors: James Karlin, 28 Clarkes Crossing, Fairport, N.Y. 14450; David G. Bank, 4801 Reservoir Rd., Geneseo, N.Y. 14454

[21] Appl. No.: 897,765

[22] Filed: Jun. 12, 1992

[51] Int. Cl.⁵ .............................................. F25D 11/00
[52] U.S. Cl. ................................. 312/405; 312/405.1; 312/406.1; 312/408
[58] Field of Search ................... 29/530; 264/515, 516; 312/405.1, 406, 406.1, 406.2, 407, 407.1, 408, 405

[56] References Cited

U.S. PATENT DOCUMENTS

| 2,839,347 | 6/1958 | Strub | 312/405 |
| 3,331,648 | 7/1967 | Petkwitz et al. | 312/405 X |
| 3,702,355 | 11/1972 | Hayden | |
| 4,779,939 | 10/1988 | Stich | 312/405 |
| 4,952,347 | 8/1990 | Kasugai | |
| 5,100,213 | 3/1992 | Vandarakis et al. | 312/405 |

FOREIGN PATENT DOCUMENTS

| 42863 | 9/1985 | Japan . |
| 42865 | 9/1985 | Japan . |
| 42866 | 9/1985 | Japan . |
| 42867 | 9/1985 | Japan . |
| 42868 | 9/1985 | Japan . |

OTHER PUBLICATIONS

Engineered Blow Molding Design, by Lincoln J. Alvord, 1989, pp. 1-13, published by G.E. Plastics.

Primary Examiner—Joseph M. Gorski
Attorney, Agent, or Firm—Shlesinger, Fitzsimmons & Shlesinger

[57] ABSTRACT

An appliance door particularly suited for use as a refrigerator or freezer door includes a hollow, blow molded door slab, and a food storage shell or casing projecting from one wall of the slab. The parts forming the shell are prepared in a first step, e.g., by blow molding, and then are removably mounted as inserts in registering recesses formed in the bottom of the cavity of one of two plates or sections forming the mold for the door slab. The two mold sections are then closed over a tubular, plastic parison which is then inflated to form in the mold the hollow door slab, portions of one wall of which mold over and around a series of male projections which extend into the mold cavity from the mold inserts, thus causing the shell to be molded to and to project from the slab upon subsequent opening of the mold sections and removal of the slab therefrom. Additional mold inserts may be used to create expansion grooves in the slab wall which supports the shell, and the opposite or outer wall of the slab may be curved to reduce undesirable effects of thermal bow.

13 Claims, 6 Drawing Sheets

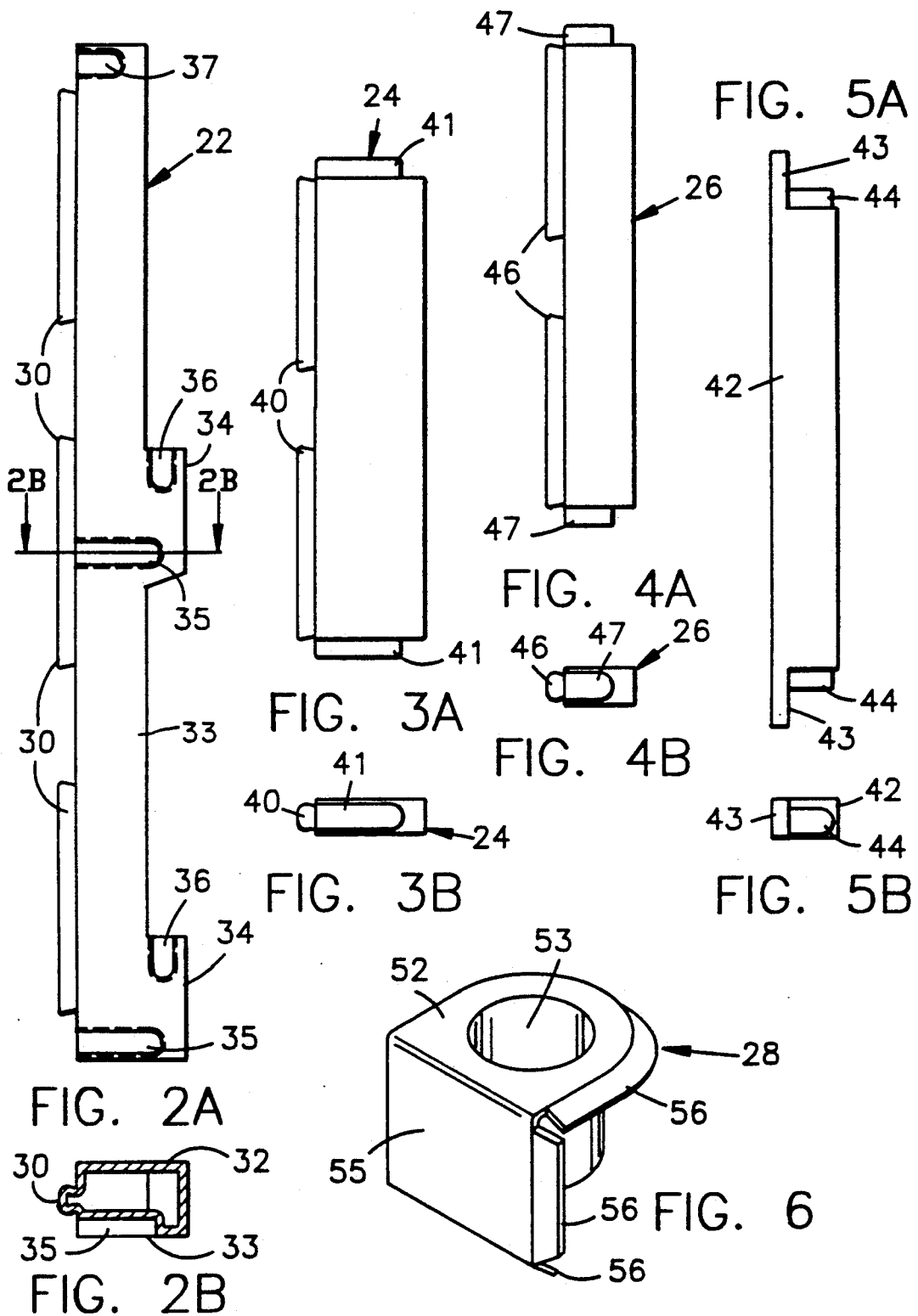

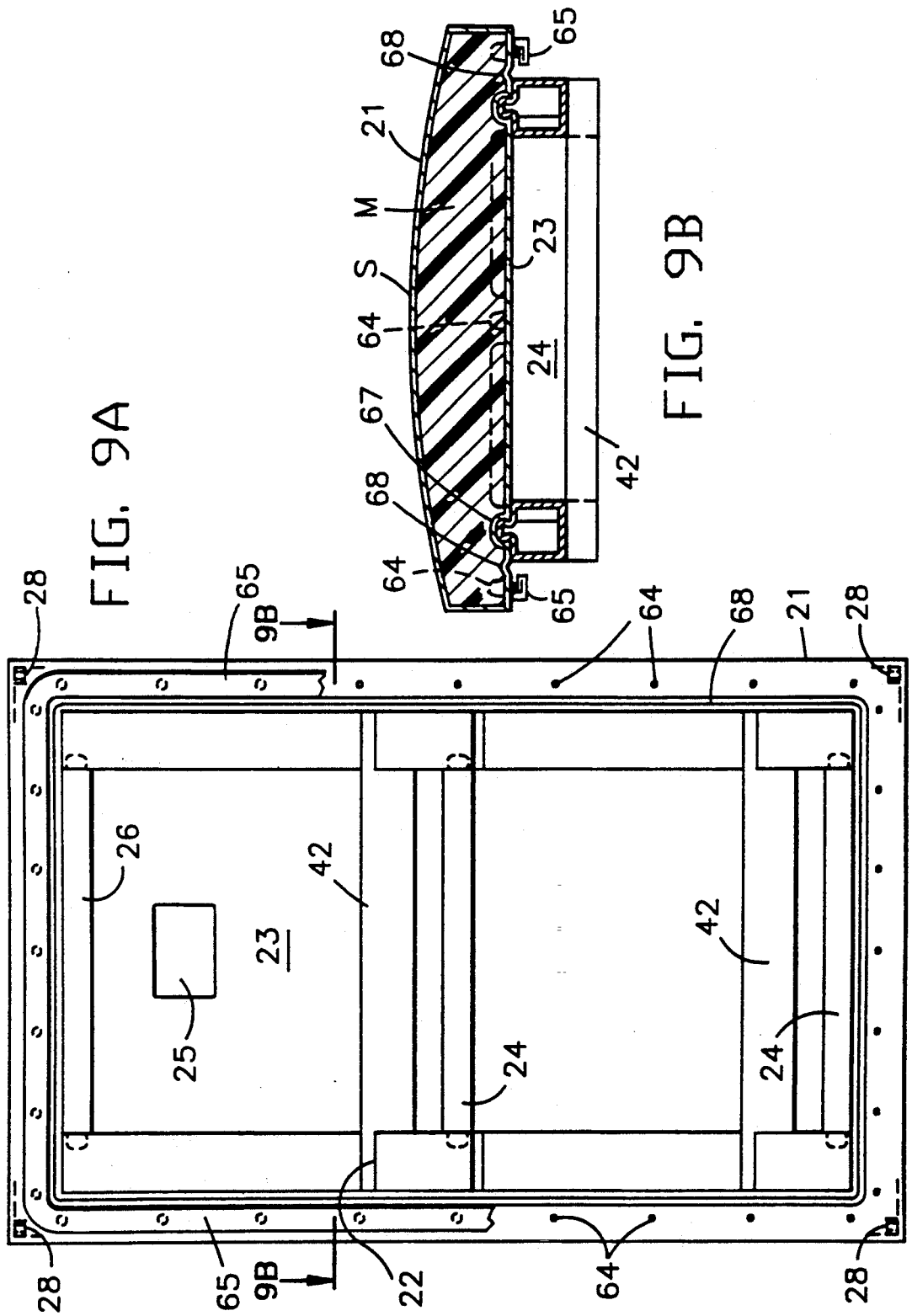

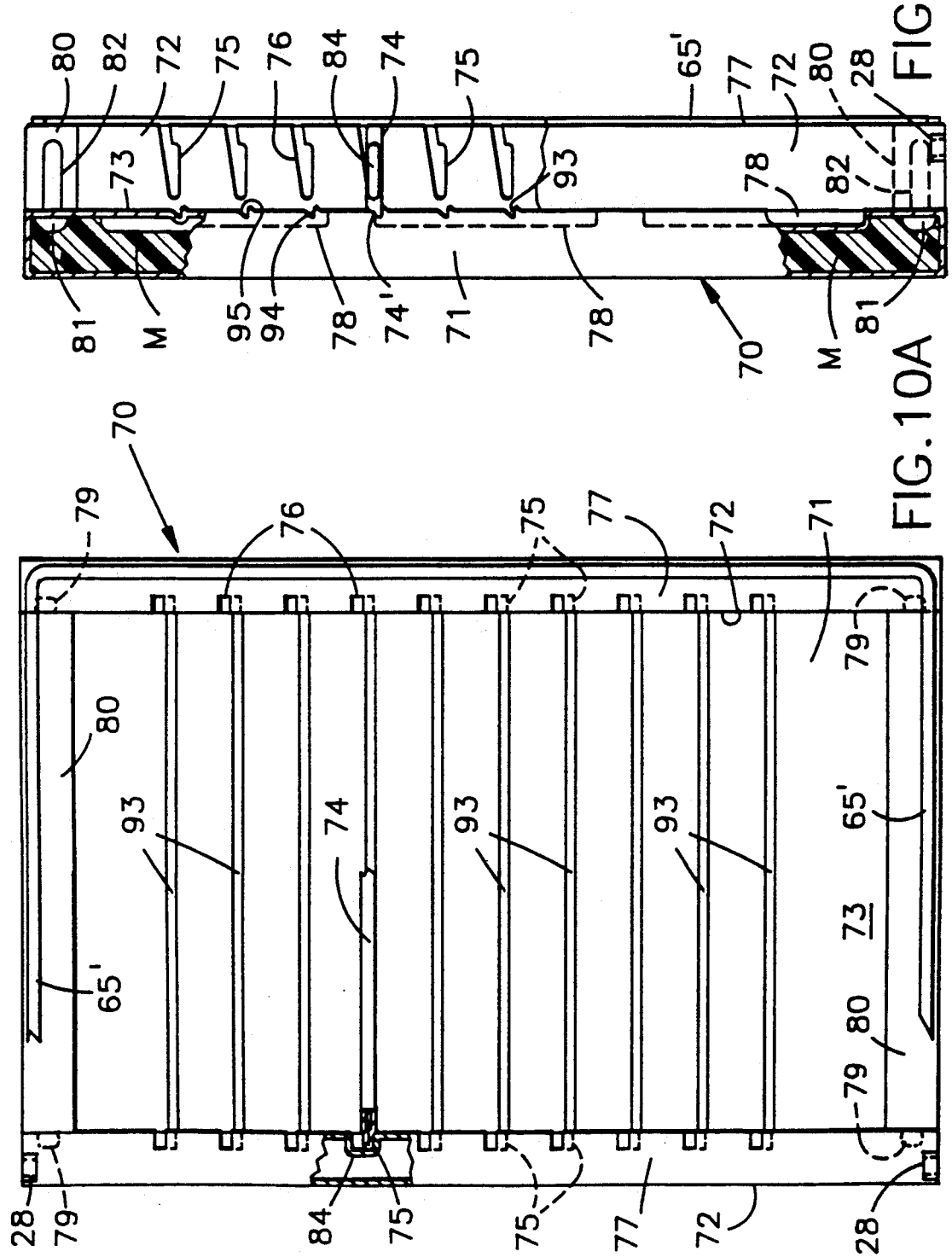

APPLIANCE DOORS AND PANELS

BACKGROUND OF THE INVENTION

This invention relates to improved appliance doors and panels, and more particularly to an improved method of manufacturing such doors and panels. Even more particularly this invention relates to a two-step manufacturing procedure for producing a blow molded plastic refrigerator door assembly that is specially designed to reduce the impact thereon of thermal bow.

As used hereinafter, thermal bow refers to that characteristic common to most of the plastic articles referred to herein—i.e., the tendency of plastic to move away from cold and toward heat. A refrigerator/freezer presents an extreme temperature difference of 60° to 90° F. from inside to outside, and within approximately two inches of distance. In a horizontal plane, where gravity is a contributor, a minimal temperature deviant will exhibit the bow condition. Previous attempts to create a plastic solution have not succeeded in managing the thermal bow characteristics. In normal conditions a plastic refrigerator door would distort outwardly, overcoming formed structural details intended to stiffen the part. Several features integrated into the new design methodology described below are believed to manage the thermal bow condition.

The conventional method of constructing refrigerator doors includes providing a stamped and formed metal shell (exterior door panel) which is adjoined to a vacuum formed plastic shell (interior door panel), either by enclosing the perimeter of the plastic shell with formed flanges on the metal shell, or by a plurality of retaining strips and screws. A gasket may also be attached to the interior shell by means of the same retaining strips and screws. Then, according to the former, a foaming agent that solidifies to become a rigid insulating material may be blown in-between the interior and exterior shells, or according to the latter, a rigid foam insulation may be inserted therebetween prior to their connection to provide additional structural support. Finally, the door handle and other decorative features are attached to the exterior shell, and pivot pin bushings are inserted into the four corners on the top and bottom ends of the exterior shell to allow reversible hanging of the door on a refrigerator. The metal shell, due to its rigidity and conductivity, does not visually exhibit the characteristic of thermal bow. There are, however, several problems using conventional refrigerator door design details for a plastics solution such as, first, the lack of structural and design features fully effectively to manage the thermal effects resulting from the internal/external temperature difference; second, the use of rigid insulation results in a direct transfer of thermal effects from the interior surface to the exterior surface; and third, the number of steps required to assemble the door.

Extrusion blow molding using special plastic resins, such as Acrylonitrile Butadiene Styrene (ABS), Polycarbonate (PC), Polyphenylene Oxide (PPO) and Polyvinyl Chloride (PVC), is a manufacturing process which is characterized by the extrusion of a tubular, molten plastic parison between opposing mold plates prior to their closure. Once the mold plates are closed the force of air introduced by a blow pin into the center of the captured parison causes the molten plastic to expand and to conform to the mold cavities and to any incongruities or inserts projecting from the confronting internal faces thereof. Efforts to use a one-step blow molding process for refrigerator or freezer door manufacture have previously been unsuccessful due to the failure of such doors adequately to manage the above-noted thermal bow problems, and material distribution problems caused by disproportionate blow ratio conditions on opposing sides of the pinch line.

It is therefore an object of this invention to provide a two-step manufacturing process and design details for the construction of an appliance door, the structural integrity of which resists the effects of thermal bow.

Another object of this invention is to provide an improved, hollow refrigerator or freezer door containing insulation types alternative to rigid foam, which enhance structural considerations and thermal bow management of such doors.

Another object of this invention is to provide a refrigerator door, the construction of which utilizes more efficient manufacturing procedures and allows for improved quality, thereby rendering such refrigerator doors more economical to produce.

Another object of this invention is to illustrate that a simplified mold design for appliance doors is possible without the need for inclusion of sophisticated slide or cam action, thereby reducing initial and on-going production costs.

Yet another object of this invention is to provide a novel refrigerator door and manufacturing method therefor which permits product line distinction, design options and model changes to be effected on a selective basis without the need for total retooling.

Other objects of this invention will become apparent hereinafter from the specification and the recital of the appended claims, particularly when considered in conjunction with the accompanying drawings.

SUMMARY OF THE INVENTION

Each door produced according to the present invention is manufactured in two distinct steps where, first, the elements which are to form the interior shell or casing (walls, shelves, shelf supports, etc.) are produced during an independent operation, for example a first blow molding operation, and second, some or all of the interior elements of the first step are utilized as mold inserts which become physically attached to the outer, hollow door slab as it is formed during a second, blow molding operation. Each completed door has an inner shell or casing having top and bottom walls, respectively, and two upright side walls, portions of which walls are retained within a molded door slab, and a number of shelves or trays which extend between the side walls.

According to one embodiment the shelves of a refrigerator door are used as mold inserts so that selected portions thereof which are exposed to the mold cavity are permanently retained in place due to collective encapsulation thereof in the molded door slab. According to a second embodiment, the inner wall of the door slab and the side walls are modified to accommodate adjustably removable shelves and/or bins. Regardless of the embodiment, structural design considerations and insulation techniques and materials are provided for the door so that it will be capable of managing thermal bow, thereby rendering the door resistant to physical deformation and distortion. These structural designs may comprise parallel grooves in the interior door surface, and/or an expansion groove extending about the perimeter of the door surface, and/or a non-planar exterior door surface. A plastic design solution provides the industry with user features not possible with the conventional manufacturing procedures and materials. Also, the manufacturing efficiencies achievable and marketing potentials possible are unique to plastic.

BRIEF DESCRIPTION OF THE DRAWINGS

FIGS. 2A and 2B are elevational and cross sectional views, respectively, of one of the two mold inserts or dams which ultimately form the two shelf-supporting side walls of this door;

FIGS. 3A and 3B are plan and end elevational views, respectively, of one of the mold inserts which forms the shelves or trays that are disposed to extend between the side walls of this door;

FIGS. 4A and 4B are plan and end elevational views, respectively, of a mold insert which forms the bridge or top wall which extends between the upper ends of the side walls of this door;

FIGS. 5A and 5B are front and side elevational views, respectively of one of the retainer bars that are used in conjunction with the shelves after the door has been molded;

FIG. 6 is a greatly enlarged fragmentary perspective view of a mold insert which forms one of four pivot pin bushings which are mounted in the four corners of this door;

FIGS. 9A and 9B are front elevational and cross sectional views, respectively, of this door as it appears after it has been molded and insulated, the door being shown with portions thereof cut away, and with an optional expansion groove located adjacent its perimeter; and FIGS. 10A and 10B are front and side elevational views, respectively, of a molded and insulated refrigerator door made in accordance with a second embodiment of this invention with parts thereof cut away and shown in section.

DETAILED DESCRIPTION OF THE PREFERRED EMBODIMENTS

Figure 1:
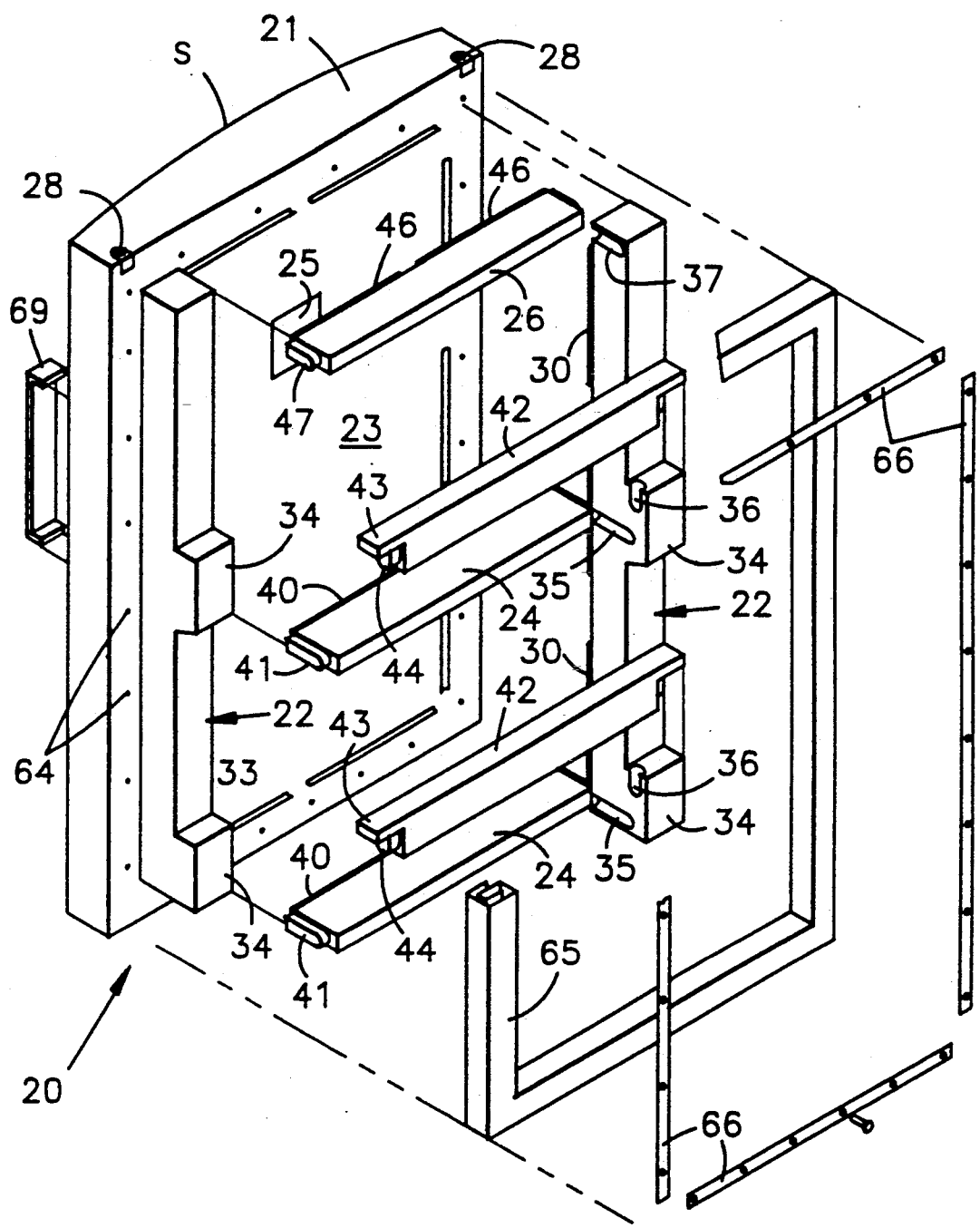
FIG. 1 is an exploded perspective view of a refrigerator door and the various parts thereof made according to a first embodiment of the present invention.

Referring now to the drawings by numerals of reference, and first to FIG. 1, 20 denotes generally a refrigerator door comprising a blow molded door slab 21, from one side of which project side walls 22, shelves 24, and an upper wall 26, and in opposite ends of which are secured pivot pin bushings 28. Door 20 is manufactured according to two successive steps. First, its door side walls 22 (FIGS. 1 and 2A, 2B), its shelves or trays 24 (FIGS. 1 and 3A, 3B), the lowermost of which also forms a bottom wall of the door, and its upper wall or bridge 26 (FIGS. 1 and 4A, 4B) are independently produced in any conventional manner, but preferably by a first blow molding operation (not illustrated). Secondly, the side walls, trays, bridge and pivot pin bushings 28 (FIGS. 1 and 6) are mounted, as described hereinafter, in one of two mold plates in such manner that selected portions thereof are exposed to or face upon the mold cavity, whereby such exposed portions are encapsulated in the inner wall 23 of door slab 21 upon the formation of the slab during a final blow molding operation (FIGS. 7A, 7B, 7C and 8).

More specifically, door 20 comprises a pair of elongate, laterally spaced side walls or door dams 22 (only one of which is illustrated in detail in FIGS. 2A and 2B), each of which is the mirror image of the other. In the preferred embodiment each wall 22 is a hollow, blow molded product having along the back edge thereof a plurality of spaced, projections 30 which are dovetail shaped in cross section, and are disposed to become encapsulated in the slab wall 23 during a subsequent or second blow molding step. Each wall 22 has a front edge thereon which is characterized by a plurality of extensions 34. Each wall 22 also has a planar outer side 32 (FIG. 2B), and an inner side 33 having therein a pair of spaced, horizontally disposed, elongate recesses 35 which open on the back edge of the wall adjacent projections 30, and a pair of vertically disposed, elongate recesses 36 which open on the upper edges of extension 34. Adjacent its upper end, the inner side 33 of each wall 22 also has therein a horizontally disposed recess 37 which opens on the back edge thereof adjacent one of the projections 30. Both recess 35 and recess 37 are intended to receive portions of trays 24 and bridge 26, respectively, as noted hereinafter.

Each hollow, blow molded tray 24 (FIGS. 3A and 3B) has a horizontally disposed inner edge having thereon a plurality of spaced projections 40 similar to projections 30, and likewise disposed to become encapsulated in the inner wall 23 of door slab 21 during a subsequent blow molding step. Projecting from each lateral edge of each tray 24 is an elongate detent 41, each of which is disposed to engage in a recess 35 in a side wall 22. The preferably hollow, blow molded top bridge 26 also has on its inner edge a plurality of spaced projections 46 which are similar to projections 30 and 40, and likewise disposed to become encapsulated in the inner wall 23 of door slab 21 during a subsequent blow molding step. Also projecting from each lateral edge thereof is an elongate detent 47, each of which is disposed to engage in a recess 37 in a side wall 22.

For each shelf or tray 24, a retainer 42 is necessary to provide support for any foodstuff which may eventually be placed thereon. Retainer 42 has thereon a top surface with flanges 43 projecting from opposite lateral ends thereof, whereby flanges 43 are disposed to be seated on the upper side of extensions 34 on walls 22. Also projecting from the lateral ends thereof are detents 44, which are disposed simultaneously to engage recesses 36 while flanges 43 are seated on extensions 34.

A consideration for each door 20 is the presence of four pivot pin bushings 28 (FIGS. 1 and 6), one of which is mounted in each of the four corners of the door so that it may be hingedly connected to a refrigerator for either left or right-handed operation. Each bushing 28, which by way of example may be formed from metal, comprises a semicircular upper wall 52 having therein a central recess or capsule 53 disposed to accommodate a pivot pin (not shown), and a rear wall 55 which is bent perpendicular to the upper wall. The entire perimeter of each bushing 28 has thereon inwardly bent flanges 56 disposed to become captured by the door slab 21 during its formation.

The mold for producing slab 21 comprises two mold plates 60 and 61 (FIGS. 7A, 7B, 7C and 8). Plate 61, which forms the exterior or outer half of door slab 21, has therein a smooth, curved cavity 62 that forms a non-planar, arched surface S (FIGS. 1 and 9B) on the exterior of door 20. In comparison to a flat surface, surface S provides greater rigidity to the door structure, thereby contributing to the ability of the door structurally to manage the forces of the thermal load placed thereon and to minimize any distortion thereof. Plate 60, which forms the inner half of slab 21, has in the bottom of its cavity a plurality of recesses 22', 24' and 26' (FIGS. 7B, 7C and 8) which conform to and removably accommodate those portions of walls 22, trays 24 and bridge 26 which ultimately are to project outwardly from wall 23 of the molded door slab 21. Also at this time the projections 41 at the ends of shelves 24 are seated in the registering recess 35 in end walls 22, as shown for example in FIG. 8, and projections 47 of wall 26 are seated in grooves 37 of the end walls. With walls 22, shelves 24 and wall 26 thus prepositioned as mold inserts within mold plate 60, the male interlocking projections 30, 40 and 46 on walls 22, trays 24 and bridge 26, respectively, project outwardly from mold plate 60 toward plate 61 and into the mold cavity which will subsequently be occupied by the inner wall 23 of door slab 21.

Figure 7A:
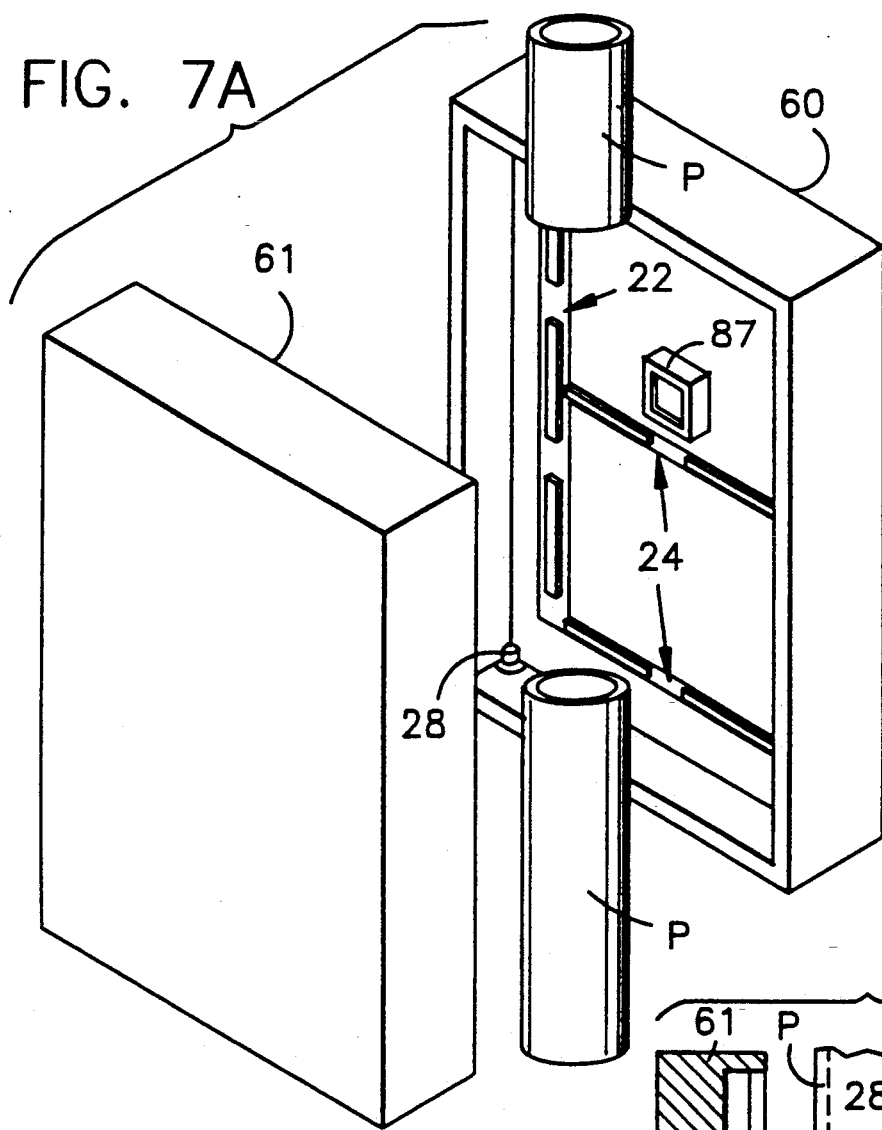
FIGS. 7A is a perspective view, and 7B and 7C are enlarged longitudinal sectional views of blow molding apparatus employed to produce this first embodiment, FIGS. 7A and 7B showing the two mold plates of the apparatus as they appear in their open positions prior to the molding step, and FIG. 7C showing the closed mold plates and how the parison conforms to the mold cavity and exposed surfaces of the inserts.
Figure 7B:
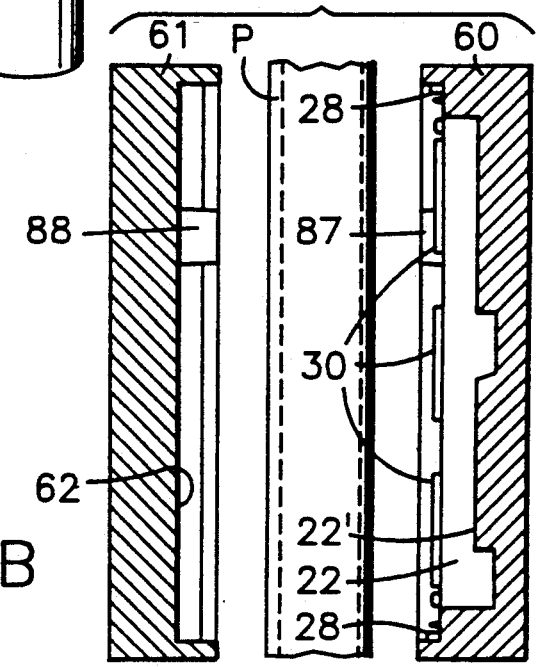
Figures 7C, 8:
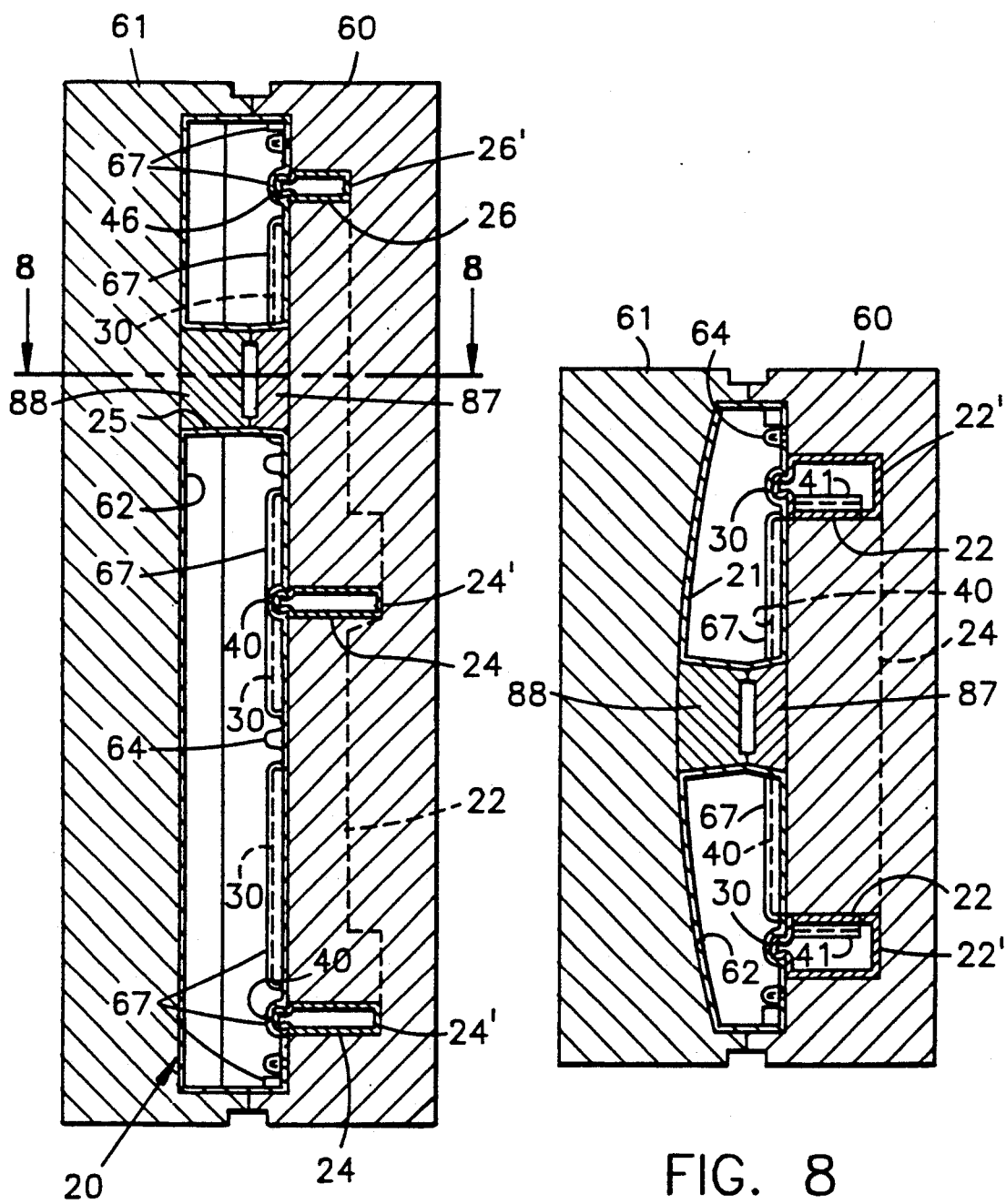
FIG. 8 is a cross sectional view taken along line 8—8 in FIG. 7C looking generally in the direction of the arrows.

To complete the set-up of plate 60, the four pivot pin bushings 28 (FIG. 6) are mounted in recesses in the corners of the rectangular mold cavity in plate 60 with the flanges 56 thereon projecting outwardly generally towards plate 61. Plate 60 also has thereon, adjacent the perimeter of its cavity an arrangement of core pins which are disposed to produce in the inner wall 23 of door slab 21 a like arrangement of molded core bosses 64. These bosses provide pockets for accommodating and retaining individual screws or the like, which are used thereafter (see FIG. 1) to anchor a gasket 65 against wall 23 beneath metal retaining strips 66, or the like. As an option, and for the purpose of forming and opening 25 (FIG. 1), which extends completely through the finished door 20 for accommodating a liquid or ice dispenser or the like (not illustrated), a pair of confronting, generally rectangularly shaped insert blocks 87 and 88 (FIGS. 7B, 7C and 8) are secured each at one end to the bottom of the cavity in the mold plates 60 and 61, respectively, and project at their opposite ends into confronting, registering engagement with each other when the mold plates are closed, as shown in FIGS. 7C and 8. Once plate 60 has been completely set-up with its interior door inserts prepositioned in its cavity, the subsequent blow molding operation may commence.

This blow mold step is effected by causing a hollow, remolten parison P to be extruded between the open plates 60 and 61 (FIGS. 7A and 7B), after which the plates are closed (FIGS. 7C and 8) to capture the parison P between opposing mold plates 60 and 61. The parison is subsequently inflated with air, which causes the plastic material forming the parison to conform with the internal mold surfaces and exposed portions of the mold inserts, thereby forming involutions 67 about the protruding male interlocking projections 30, 40 and 46, and flanges 56. The involutions 67 in the slab wall 23 form encapsulations around the male interlocking projections 30, 40, and 46, and flanges 56, thereby effectively integrating parts 22, 24, 26 and 28 with the door slab 21, and forming therefrom an inner shell or casing for supporting food on the inside of door 20. Once this blow molding operation is complete and the plastic has cooled, the door slab 21 may be removed from between the mold plates so that retainers 42 may be inserted in recesses 36 of the side walls, and finishing details such as placement of the gasket 65 and the handle 69 (FIG. 1) may be effected.

After completion of the foregoing molding operation, and in order more efficiently to manage thermal bow, a non-rigid insulating material M (FIG. 9B) is inserted into the space located between the curved outer wall and the inner wall 23 of door 20, and functions to dampen and minimize the transfer of thermal bow from the interior surface to the exterior surface. Optionally, the non-rigid insulating material M may be either a blown foam agent, loose fiberglass particles, etc.

A structural feature, which can be used in door 20 in combination with the above-noted non-rigid insulation M to contribute to greater physical and dimensional stability of the door, is the presence of a uniform depth expansion groove 68 (FIGS. 9A and 9B), which may be formed around the inner wall 23 of door slab 21 adjacent the perimeter thereof. Groove 68 extends around the outside of the inner shell or casing defined by the walls 22, 26 and the lowermost tray 24, and inwardly of the array of bosses 64. Such an expansion groove 68 will further contribute to the structural integrity of the refrigerator door 20 by absorbing and redistributing the effects of thermal bow placed upon the interior door surface, thereby allowing the door to resist any distortion or warping of the exterior surface. Cosmetically, the groove 68 may be hidden by the gasket 65, which would be attached adjacent thereto and in overlapping relation. Placement of gasket 65 in such a position will not only conceal the groove 68, but also reduce the amount of dust or other organic matter which may settle and collect therein.

Referring no to the embodiment shown in FIGS. 10A and 10B, 70 generally denotes a refrigerator door having a hollow door slab 71 containing insulation M, and disposed adjustably to accommodate adjacent its inner wall 73 a plurality of removable trays 74 or the like, only one of which is shown fragmentarily in each of FIGS. 10A and 10B. Door 70, which has a flat or planar rather than curved outer wall, is also manufactured according to a two-step operation whereby, first, the door side walls 72, top and bottom walls 80 which are to form the inner shell or casing, and the trays 74 are independently produced utilizing, preferably, blow molding operations. Secondly, the door side walls 72 and top and bottom walls 80 are securely retained on wall 73 upon the formation of the door slab 71 during the subsequent blow molding operation. Unlike the first embodiment, the side walls 72 and top and bottom walls 80 are retained on wall 73 immediately adjacent and about the perimeter thereof, which essentially provides a larger inner shell or casing, and consequently greater storage area.

A pair of elongate, hollow door side walls 72 are similarly required for each refrigerator door 70, and again, each such wall is the mirror image of the other. Each wall 72 has along the back edge thereof a plurality of spaced, interlocking projections 78 which appear dovetailed in cross section, and which are disposed to become encapsulated in wall 73 of door slab 71 during the blow molding operation. Each wall 72 has in its inner side a plurality a equispaced, horizontally disposed, elongate recesses 75, each of which communicates at its outer end with an inclined slot 76 that extends upwardly and opens onto the outer or front edge 77 of each end wall. Also, side walls 72 have on their inner sides, respectively, adjacent the upper and lower ends thereof, horizontally disposed recesses 79 which are disposed to receive top and bottom walls 80 as noted hereinafter.

Each top and bottom wall 80 generally resembles the top wall 26 of the first embodiment. Although slightly thicker than top wall 26, top and bottom walls 80 have along their back edges a plurality of interlocking projections 81 which are similar to projections 78 and likewise are disposed to become encapsulated in wall 73 of door slab 71 during the blow molding operation. Also, walls 80 have extending from their opposed lateral ends elongate detents 82 which engage in recesses 79 on side walls 72, thereby securing together walls 72 and 80 while they are retained by door slab 71.

Each tray 74 generally resembles the trays 24 of the previous embodiment. However, the back or inner edge 74' of each tray 74 is tapered downwardly from the upper surface to the bottom surface thereof in order to facilitate easy removal of tray 74 from door 70 as noted hereinafter. Similar to trays 24 of the previous embodiment, trays 74 have projecting from their opposite lateral ends elongate detents 84, which are disposed to be seated removably and slidably within recesses 75 in opposing side walls 72.

Registering with the inner ends of each pair of recesses 75 in side walls 72 is a horizontally disposed groove 93, which is formed in the interior surface 73 of door slab 71 by the tapered inner edges 74' of the tray inserts 74 during the blow molding operation. The grooves 93 extend between the door walls 72 and conform to the shape of the tapered edges 74' of trays 74. Each groove 93 appears generally Z-shaped in cross section and comprises a flat, horizontal shelf 94 (FIG. 10B) which projects outwardly slightly beyond the interior surface 73 before tapering downwardly towards the interior surface, and an inclined roof 95 which tapers into the door slab 71 where it joins shelf 94. Trays 74 are releasably seated in door 70 between door walls 72 by sliding their back edges into groove 93 and their opposed lateral detents 84 into slots 76 and subsequently recesses 75, respectively.

Another difference between the first embodiment and the present embodiment is the placement of the pivot pin bushings. Rather than being located in the upper and lower corners of the door slab 71, they are mounted in the inner shell or casing. Specifically the bushings 28 in this second embodiment are placed in the upper and lower corners of the side walls 72 adjacent the edges thereof remote from the inner wall 73 of slab 71. Consequently, the axis of rotation for the door according to the second embodiment extends through one of the side walls 72 rather than extending through the door slab itself. Due to the location of the side, top and bottom walls and the placement of the pivot pin bushings, a gasket 65' must be placed about the perimeter of the collective wall structure.

Relocation of trays 74 may be effected simply by raising the front edge of a tray upwardly and away from the door 70 such that opposed detents 84 enter slots 76, whereby continued upward and outward movement will release a tray from door 70. Once a tray has been removed, and the desired new location has been found, detents 84 are reinserted into a pair of opposing slots 76, and the tray is slidably pushed downwardly and inwardly to seat the tray in its new position.

In addition to the horizontal arrangement of grooves 93, other structural design features may also be added to the door 70. Such design features are displayed in the figures dedicated to the first embodiment and may include, instead of a planar outer wall, the arching of the exterior door wall, and/or an expansion groove located in the interior door surface adjacent the perimeter thereof. In the second embodiment, the expansion groove would have to be located adjacent the perimeter of the door, yet interior to the side, top and bottom walls. Each of these structural features will greatly contribute to the ability of the door to manage thermal bow and resist any outward distortion of the interior and exterior door surfaces. Also, the greater the number of such features which are present, then greater is the resistance to the thermally induced distortion.

In addition to the use of trays 74 in connection with the second embodiment, removable storage bins may also be employed using a similar array of detents to engage recesses 75 and groove 93. Also, variations of the flange and recess mechanism may also be employed in lieu of providing shelves and/or bins which are easily releasably secured to the door interior. Another variation to this mechanism would be the use of a plurality of detents projecting from the inner side of side walls 72 for engagement with a surface, or recess in a surface, of the trays and/or bins.

Regardless of the embodiment, several design modifications may also contribute to easier assembly of the doors 20 and 70, such as the incorporation of a snap-in gasket 65. A gasket receptacle may be produced independently of the door and subsequently encapsulated therein during the second blow molding step (for doors produced according to the first embodiment) or the gasket receptacle may be formed in the exterior of the side, bottom and top walls (for doors produced according to the second embodiment), whereby such easy insertion of the gasket 65 into its receptacle would obviate the need for timely attachment of gasket 65 using screws or the like, as previously disclosed. A second modification may include the formation of an integral door handle in the exterior surface of door 20 or 70. A vertically disposed handle adjacent one lateral side of door 20 or 70 would necessitate the production of both left and right-handed doors. However, a horizontally disposed integral handle spanning the width of the door would still allow for reversible door mounting, as previously described. Such a door handle would obviate the need for mechanically joining a door handle to the exterior surface of the door.

Several cosmetic design considerations are also available for both embodiments without the requirement of complex manufacturing steps. For example, door within door assemblies may be effected using simple mold set-up procedures, thereby allowing access to individual interior door compartments without requiring the primary door to be opened. A second example is the addition of a third door dam or wall insert, either partial or full-length, for the purpose of creating a greater number of specialized compartments or shelves. A third example is the placement of a uniform depth recess of any desired shape, such as rectangular or oval, etc., in the exterior surface of door slab 21 or 71 for the purpose of mounting therein a corkboard, erasable message board or the like. This could be effected in door 20 by using only insert 88 rather than both inserts 87 and 88.

A fourth example is the incorporation of folded retaining strips with the lateral and bottom edges of the door slab 21 or 71 during the second blow molding step. The addition of the retaining strips would allow custom fascia retainably to be inserted therebetween against the exterior surface of the door slab, thereby allowing a refrigerator decoratively to be coordinated with the kitchen interior into which it has been placed.

A cold liquid and ice dispenser receptacle, among other functional options, may also be incorporated into the the access opening 25 in door 20, or in a recess in the exterior wall of the door, more easily than with conventional door assemblies. Whereas accommodations for the liquid and ice dispenser require post production modifications of conventional doors, the manufacturing process of the present invention allows a housing for the liquid and ice dispenser to be captured in the exterior door surface during the second step. Actual installation of the water line and equipment required for these services would, however, require additional work and time as is the case with conventional refrigerator doors.

Although this invention has been described in conjunction with certain door walls 22 and 72, trays 24 and 74 and bridge 26, it should be apparent to those skilled in the art that alternative design configurations may also be employed for performing the desired services thereof without departing from the scope of this invention.

Moreover, while this invention has been described and illustrated with only certain embodiments thereof, it will be apparent that this invention is capable of still further modifications, and that this application is intended to cover any such modifications as may fall within the scope of one skilled in the art or the appended claims.

We claim:

1. An appliance door, comprising
   a hollow, plastic, molded door slab having a pair of vertically spaced upper and lower end walls, respectively, and a pair of spaced inner and outer walls, respectively, extending between said end walls,
   a storage shell projecting from the side of said inner wall of said slab remote from said outer wall thereof,
   said shell comprising a pair of laterally spaced side walls extending vertically of said slab, and a pair of vertically spaced upper and lower end walls, respectively, connected at opposite ends thereof to said side walls and extending transversely therebetween,
   each of said walls of said shell having thereon at least one projection molded in a registering recess in said inner wall of said slab thereby to fix said walls of said shell to said slab,
   a pair of vertically spaced pivot pin bushings anchored coaxially of each other in one of said pairs of vertically spaced end walls for use in mounting the door for pivotal movement on an appliance, and into and out of a closed position in which said shell faces the interior of said appliance, and
   expansion means formed in said door slab to compensate for any thermal bow caused by temperature differentials between the walls of said door slab and the interior of an appliance upon which the slab is mounted.

2. The appliance door as defined in claim 1, wherein said pivot pin bushings are anchored in said upper and lower end walls, respectively, of said door slab.

3. The appliance door as defined in claim 1, wherein said pivot pin bushings are anchored in said upper and lower end walls, respectively, of said shell.

4. The appliance door as defined in claim 1, including
   a shelf mounted in said shell between said upper and lower end walls thereof, and extending transversely between the side walls of said shell, and
   said shelf having on opposite ends thereof projections which are seated in registering grooves formed in said spaced side walls of said shell.

5. The appliance door as defined in claim 4, wherein
   said shelf has thereon at least one further projection embedded in a registering recess in said inner wall of said slab operatively to fix said shelf to said door slab, and
   each of said recesses in said inner wall of said slab is formed by molding registering portions of said inner wall around said projections on said walls of said shell, and around said further projections on said shelf, whereby each of said recesses in said inner wall has the same configuration as the projection embedded therein.

6. The appliance as defined in claim 4, wherein
   said shelf has thereon at least one further projection slidably seated in a registering recess in said inner wall of said door slab, and
   said projections on said opposite ends of said shelf are slidable selectively through openings formed in the ends of said registering grooves remote from said slab, whereby said shelf is removably mounted in said shell between said side walls thereof.

7. The appliance door as defined in claim 1, wherein said expansion means comprises a shallow groove formed in and around said inner wall of said door slab adjacent the periphery thereof.

8. The appliance door as defined in claim 7, including a resilient gasket secured to said inner wall of said door slab around and in overlapping relation to said groove.

9. The appliance door as defined in claim 1, wherein said outer wall of said door slab is non-planar.

10. The appliance door as defined in claim 1, wherein said outer wall of said door slab is curved slightly outwardly from said inner wall about an axis extending parallel to the common axis of said pivot pin bushings and substantially medially of the sides of said slab.

11. The appliance door as defined in claim 1, wherein
    each of said pivot pin bushings comprises a socket member having therein a circular recess for accomodating a pivot pin, and
    an integral flange is attached to and surrounds each of said socket members and is embedded in said door slab adjacent one corner thereof operatively to support socket its attached member with said recess therein facing outwardly of said slab.

12. The appliance door as defined in claim 1, wherein said expansion means comprise a plurality of spaced, parallel grooves formed in said inner wall of said slab and extending transversely of said side walls of said shell.

13. The appliance door as defined in claim 1, including insulation material disposed in and substantially filling the space between said inner and outer walls of said door slab.

* * * * *